(No Model.)
J. A. TRAUT.
LEVEL ATTACHMENT FOR BORING TOOLS.
No. 352,721. Patented Nov. 16, 1886.
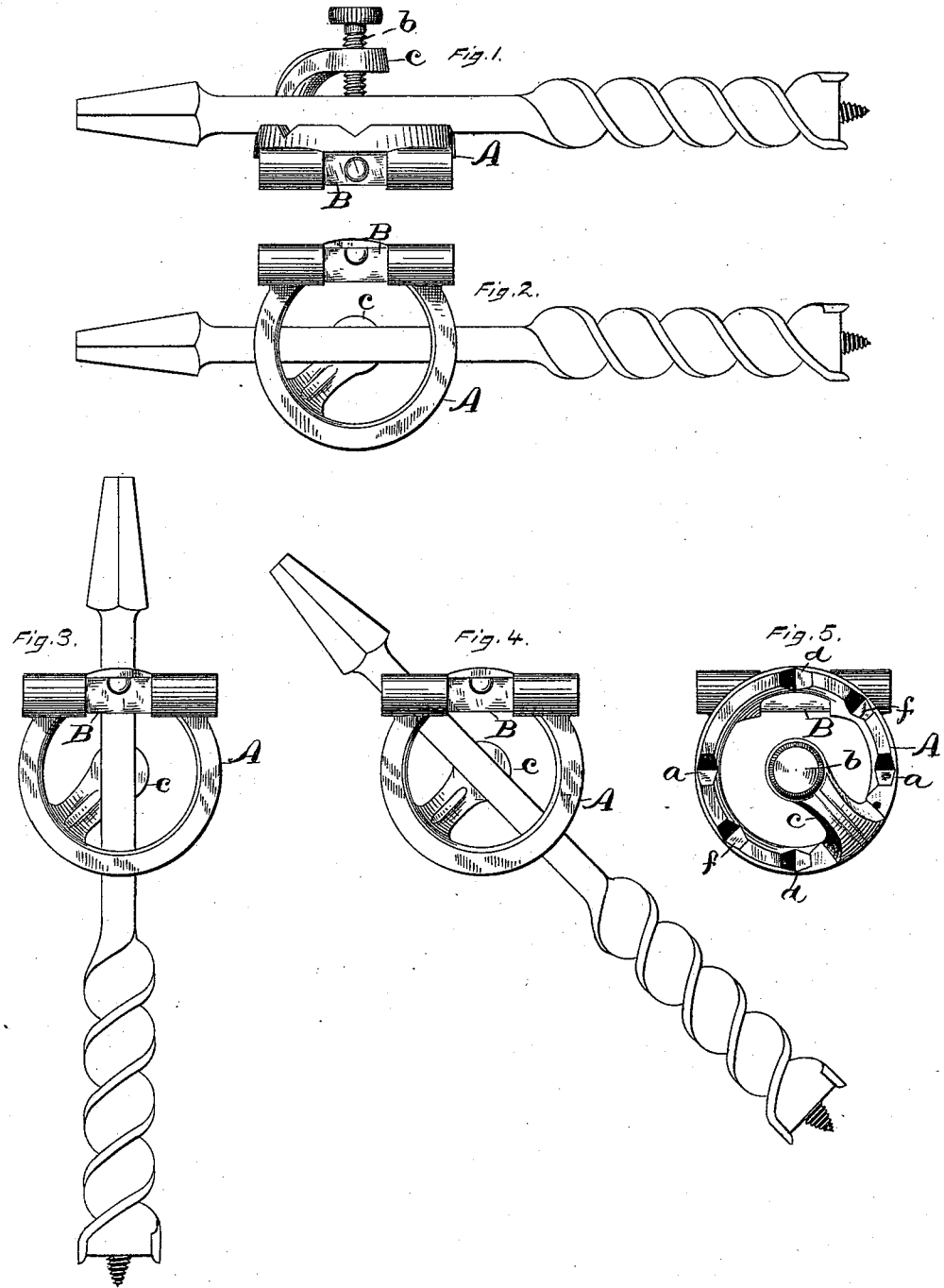

United States Patent Office.

JUSTUS A. TRAUT, OF NEW BRITAIN, CONNECTICUT, ASSIGNOR TO THE STANLEY RULE AND LEVEL COMPANY, OF SAME PLACE.

LEVEL ATTACHMENT FOR BORING-TOOLS.

SPECIFICATION forming part of Letters Patent No. 352,721, dated November 16, 1886.

Application filed July 3, 1886. Serial No. 207,123. (No model.)

*To all whom it may concern:*

Be it known that I, JUSTUS A. TRAUT, a citizen of the United States, residing at New Britain, in the county of Hartford and State of Connecticut, have invented certain new and useful Improvements in Level Attachments for Boring-Tools, of which the following is a specification.

My invention relates to improvements in spirit-levels for boring-tools; and the object of my invention is to provide a tool which can readily be attached and detached to and from the shanks of augers, boring-bits, and other analogous tools, for the purpose of aiding the operator to bore a hole in a desired plane.

In the accompanying drawings, Figure 1 is a plan view of my level together with a boring-bit, to the shank of which said level is secured in proper position for boring horizontally. Fig. 2 is a side elevation of the same. Fig. 3 is a side elevation of the same with said level attached in position for boring vertically. Fig. 4 is a side elevation of the same with the level attached in position for boring a hole at an angle of forty-five degrees from horizontal; and Fig. 5 is a side elevation of my said level, showing the opposite side from that illustrated in the other side elevations.

A designates a frame having at one side a level-case, in which a spirit-level, B, of the ordinary tubular form is placed. Said frame is also provided with suitable notches or recesses, *a a*, which notches form a socket that extends parallel to the tubular level and which is adapted to receive one side of a bit-shank or other boring-tool, while the set-screw *b* in the arm *c* of the frame is brought to bear upon the opposite side of the bit-shank, and serve as a clamping mechanism for holding the level upon said shank, as shown in Figs. 1 and 2. The level thus attached will revolve with the boring-tool, and may be observed from time to time, to guide the operator in boring the hole horizontally.

In order to guide the operator in boring a vertical hole, the said frame is also provided with a socket, formed by the notches *d d*, and extending at right angles to the tubular level, so that the level may be attached to the bit with the latter at right angles to the level, as shown in Fig. 3.

In order to enable the operator to bore a hole at forty five degrees from horizontal, I provide the frame with notches *f f*, thereby forming a socket which extends across the frame at an angle of forty-five degrees to the level B, as shown in Fig. 4. The clamping-screw *b* is in the center of the frame as viewed from one side, so that it serves to clamp the bit shank within either of the several sockets of said frame, as may be desired. These three sockets are all that will ordinarily be desired, but other sockets may be added, if advisable.

I am aware that bit-stocks have been provided with spirit-levels as a permanent part thereof; also, that a prior patent shows a circular spirit-level made attachable and detachable from the bit-stock or bit-shank, so that when attached the center of the level was in the axial line of the bit for use in boring vertically; also, that a prior patent shows a tubular level adapted to be suspended by hooks upon a bit-shank for boring horizontally, the level being held in proper position by a suitable weight. I am also aware of Patent No. 92,927, dated July 27, 1869. All of said prior art is hereby disclaimed.

I claim as my invention—

A level for boring-tools consisting, essentially, of the frame having the tubular level mounted thereon, two or more sockets extending across the frame at different angles, and clamping mechanism for holding the shank of the boring-tool within either of said sockets, substantially as described, and for the purpose specified.

JUSTUS A. TRAUT.

Witnesses:
H. S. WALTER,
F. N. STANLEY.